United States Patent
Calderon

(10) Patent No.: US 12,140,090 B2
(45) Date of Patent: Nov. 12, 2024

(54) GAS TURBINE ENGINE CONTROL SYSTEM AND METHOD FOR LIMITING TURBINE OVERSPEED IN CASE OF A SHAFT FAILURE

(71) Applicant: Rolls-Royce Deutschland Ltd & Co KG, Blankenfelde-Mahlow (DE)

(72) Inventor: Jorge Calderon, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 18/544,908

(22) Filed: Dec. 19, 2023

(65) Prior Publication Data

US 2024/0209802 A1    Jun. 27, 2024

(30) Foreign Application Priority Data

Dec. 23, 2022  (EP) .................................. 22216427

(51) Int. Cl.
*F02C 9/52*  (2006.01)
*F01D 21/02* (2006.01)
*F02C 9/54*  (2006.01)

(52) U.S. Cl.
CPC ............... *F02C 9/52* (2013.01); *F01D 21/02* (2013.01); *F02C 9/54* (2013.01);
(Continued)

(58) Field of Classification Search
CPC .... F02C 9/52; F02C 9/54; F01D 21/02; F05D 2270/021; F05D 2270/09; F05D 2270/821
See application file for complete search history.

(56) References Cited

U.S. PATENT DOCUMENTS

| 9,341,076 B2 * | 5/2016 | Rowe ................... F04D 27/0246 |
| 9,689,316 B1 * | 6/2017 | Crom ........................ F02C 9/26 |

(Continued)

FOREIGN PATENT DOCUMENTS

| CN | 112128133 A | 12/2020 |
| EP | 2514927 A2  | 10/2012 |

(Continued)

OTHER PUBLICATIONS

European Search Report dated Jul. 6, 2023 from counterpart European Patent Application No. 22216427.9.

*Primary Examiner* — Jesse S Bogue
(74) *Attorney, Agent, or Firm* — SHUTTLEWORTH & INGERSOLL, PLC; Timothy J. Klima

(57) ABSTRACT

A gas turbine engine control system and a method for limiting turbine overspeed in case of a shaft failure. An overspeed protection system detects a shaft failure of the engine. A variable stator vane mechanism adjusts stator vanes of a compressor of the engine in their rotational position, and is activated to move at least one row of the stator vanes into a closed position which blocks air flow through the compressor in case a shaft failure is detected. Bleed valves in the compressor have closed and open positions and divert in the opened position airflow through the compressor to a bypass channel. A detection system detects directly or indirectly the position of the stator vanes, and the control system sets the bleed valves to the open position when the detection system detects that the stator vanes have moved into the closed position.

14 Claims, 6 Drawing Sheets

(52) U.S. Cl.
CPC .... *F05D 2270/021* (2013.01); *F05D 2270/09* (2013.01); *F05D 2270/821* (2013.01)

(56) References Cited

U.S. PATENT DOCUMENTS

| | | |
|---|---|---|
| 11,236,681 B2 * | 2/2022 | Beauchesne-Martel ..................... F02C 9/28 |
| 11,401,825 B2 | 8/2022 | Calderon |
| 2011/0182716 A1 | 7/2011 | Bouru et al. |
| 2011/0190950 A1 | 8/2011 | Colotte et al. |
| 2014/0075956 A1 | 3/2014 | Patsouris |
| 2017/0254295 A1 | 9/2017 | Moster et al. |
| 2018/0156138 A1 | 6/2018 | Elgezabal Gomez |
| 2018/0328287 A1 | 11/2018 | Moniz et al. |
| 2020/0131918 A1 * | 4/2020 | Calderon .................. F02C 9/46 |
| 2020/0309039 A1 * | 10/2020 | Smith ..................... H02P 11/00 |
| 2023/0407761 A1 * | 12/2023 | Sibbach .................. F01D 21/02 |

FOREIGN PATENT DOCUMENTS

| | | |
|---|---|---|
| EP | 3626627 A1 | 3/2020 |
| EP | 3647567 A1 | 5/2020 |
| GB | 2230822 A | 10/1990 |
| JP | 2019052586 A | 4/2019 |

* cited by examiner

GAS TURBINE ENGINE CONTROL SYSTEM AND METHOD FOR LIMITING TURBINE OVERSPEED IN CASE OF A SHAFT FAILURE

This application claims priority to European Patent Application 22216427.9 filed Dec. 23, 2022, the entirety of which is incorporated by reference herein.

DESCRIPTION

The invention regards a gas turbine engine control system and a method for limiting turbine overspeed in case of a shaft failure.

In the event that a shaft of a gas turbine engine breaks it is necessary to avoid an over speeding of the turbine section to prevent breaking of the turbine. Overspeed protection systems are known in this respect which automatically shut off the fuel supply to the engine combustor in case an overspeed situation is detected.

Document EP 3 647 567 A1 discloses closing the variable stator vanes of a compressor in the primary channel of a gas turbine engine using the fuel pressure of an overspeed and splitter unit which is actuated in case of a shaft failure detection. By closing the variable stator vanes, the gas path in the primary channel of the gas turbine engine is blocked which results in an improved effect on restraining energy from the core of the gas turbine engine.

The problem underlying the present invention is to provide a gas turbine engine control system and method that provide further improvements in restraining energy from the core of the gas turbine engine in case of a shaft failure.

This problem is solved by a gas turbine engine control system and a method with features as disclosed herein. Embodiments of the invention are identified in the present disclosure.

A gas turbine engine control system for limiting turbine overspeed in case of a shaft failure is provided, wherein the control system comprises an overspeed protection system which is able to detect a shaft failure of the gas turbine engine. The control system further comprises a variable stator vane mechanism, wherein the variable stator vane mechanism is configured to adjust variable stator vanes of a compressor of the gas turbine engine in their rotational position, wherein the variable stator vane mechanism is activated to move at least one row of the variable stator vanes into a closed position which blocks air flow through the compressor in case a shaft failure is detected. Further, the system comprises bleed valves in the compressor of the gas turbine engine having a closed position and an opened position, wherein the bleed valves are configured to divert in the opened position airflow through the compressor to a bypass channel of the gas turbine engine.

It is provided that the gas turbine engine control system further comprises a detection system detecting directly or indirectly the position of at least one row of the variable stator vanes, wherein the control system is configured to set the bleed valves to the opened position when the detection system detects that the at least one row of variable stator vanes has moved into the closed position.

The invention is based on the idea that blocking the gas path of the primary channel of the gas turbine engine by the variable stator vanes triggers bringing the bleed valves into the opened position in which airflow is diverted to a bypass channel of the gas turbine engine. This further improves the effect of restraining energy from the core of the engine.

The invention provides for an improved safety mechanism in case of a shaft failure, the safety mechanism blocking the gas path in the primary channel of the gas turbine engine and diverting gas through the bleed valves to the secondary channel of the gas turbine engine in addition to shutting off the fuel supply to the engine which represents the standard measure.

The present invention is associated with the further advantage that it may be implemented without adding any hardware to the gas turbine engine control system as the detection system detecting the position of at least one row of the variable stator vanes may be implemented using a sensor which, in normal operation, serves to inform an electronic control unit about the actual position of the variable stator vanes to allow the electronic control unit to command the variable stator vanes to a target position in a feedback loop.

Further advantages associated with the present invention lie in an increased range of operating conditions under certification levels of safety and the reduction of the critical overspeed condition which translates into a reduction in weight of the engine as critical components may be mechanically designed for less stringent conditions.

It is pointed out that once a shaft failure has been detected, the variable stator vanes are moved in the completely closed position independent of the rotational speed of the turbine.

It is further pointed out that the bleed valves may have two actuating positions only, namely, the opened position and the closed position, or may alternatively be variably positionable between a fully opened position and a fully closed position. In the latter case, the opened position includes the fully opened position such that air in the gas path is guided to the secondary channel in the most effective manner.

The compressor in which the variable stator vane mechanism and the bleed valves are implemented may be a low-pressure compressor, a medium-pressure compressor or a high-pressure compressor of the gas turbine engine. Also, the present invention may be implemented in several or all of the compressors of a gas turbine engine.

In an embodiment, the control system further comprises an electronic control unit (such as the EEC), wherein the bleed valves are set to the opened position under the control of the electronic control unit. The bleed valves are controlled by the EEC and may be variably positionable between a fully opened position and a fully closed position.

In a further embodiment, the detection system comprises a position sensor that feeds the position of at least one row of the variable stator vanes or of an actuator (such as an actuating rod) of the at least one row of variable stator vanes to the electronic control unit. The position sensor may be implemented in the form of a LVDT (Linear Variable Differential Transformer) which is a type of electrical transformer suitable for measuring linear displacement.

In an embodiment, the electronic control unit is configured to compare the position of at least one row of the variable stator vanes or the position of the actuator of the at least one row of variable stator vanes with a target position, wherein, if the two positions differ more than a predetermined threshold, the electronic control unit is further configured to set the bleed valves to the opened position. As the target position to which the electronic control unit in normal operation positions the variable stator vanes strongly differs from the closed position in which air flow through the compressor is blocked, a clear determination can be made if the two positions differ more than a predetermined threshold, corresponding to a signal received from the position sensor which is a vastly different compared to the signal received in the target position.

In a further embodiment, the electronic control unit control is configured to determine the rate of change of the position of at least one row of the variable stator vanes or rate of change of the position of the actuator of the at least one row of variable stator vanes, wherein, if the rate of change is above a threshold rate of change, the electronic control unit is further configured to set the bleed valves to the opened position. In case of a shaft failure, the variable stator vanes are quickly moved into the closed position. The rate of change of the position is thus much larger than in normal operation in which the position is slowly adjusted with respect to a target position in a feedback loop. The rate of change thus represents a further clear determination that allows to trigger opening of the bleed valves.

In an embodiment, the above two criteria are combined, namely, the electronic control unit is configured to set the bleed valves to the opened position if both the two positions differ more than the predetermined threshold and if the rate of change is above the threshold rate of change. As both of the two above criteria rely on clear changes from normal operation conditions, their combination provides for a strong robustness of the system, excluding risks in the form of false activations of the bleed valves.

In a further embodiment, the control system comprises
a fuel limiting mechanism coupled to the overspeed protection system, wherein the fuel limiting mechanism is configured to limit the fuel supply to the gas turbine engine combustor if the overspeed protection system detects a shaft failure;
wherein the variable stator vane mechanism is coupled to the fuel limiting mechanism, and wherein the variable stator vane mechanism is activated to move at least one row of the variable stator vanes into the closed position if the fuel limiting mechanism limits the fuel supply to the gas turbine engine combustor.

According to this embodiment, the variable stator vane mechanism is activated by means of the fuel limiting mechanism, wherein the fuel limiting mechanism is configured to divert pressurized fuel that under normal operating conditions is used to feed the engine combustor to the variable stator vane mechanism.

The control system may be further configured in that
the overspeed protection system activates an activation member in case a shaft failure is detected;
the fuel limiting mechanism is coupled with the activation member (40) and configured to limit the fuel supply to the gas turbine engine combustor if the activation member is activated;
a connecting fuel line is provided that connects the fuel limiting mechanism and the variable stator vane mechanism,
wherein upon activation of the activation member the fuel limiting mechanism pressurizes the connecting fuel line, thereby activating the variable stator vane mechanism to move at least one row of the variable stator vanes into the closed position.

The fuel limiting mechanism is configured to divert pressurized fuel that under normal operating conditions is used to feed the engine combustor to the connecting fuel line if the activation member is activated.

It may be further provided that the fuel limiting mechanism comprises an emergency shut-off valve and a splitter valve, wherein upon activation of the activation member the emergency shut-off valve activates the splitter valve to limit the fuel to the combustor, wherein the splitter valve is activated by diverting to the splitter valve through the emergency shut-off valve pressurized fuel that under normal operating conditions is used to feed the engine combustor.

The fuel limiting mechanism may be implemented in an overspeed and splitter unit which
splits the pressurized fuel coming from a fuel metering unit into upper and lower fuel manifolds that feed the combustor nozzles under normal operating conditions;
limits the fuel from the fuel metering unit into the manifolds if the activation element is activated; and
pressurizes the connecting fuel line if the activation element is activated.

In a further embodiment, the connecting fuel line is connected to a valve, an actuator and/or a control element of the variable stator vane mechanism, wherein pressurizing the connecting fuel line activates the valve, actuator or control element to effect movement of at least one row of the variable stator vanes into the closed position.

The variable stator vane mechanism may comprise a control valve, an actuator, a coupling mechanism and at least one unison ring connected to stator vanes, wherein
the control valve controls actuation of the actuator by means of high pressure and low pressure fuel lines,
the coupling mechanism couples the actuator and the at least one unison ring, and,
the actuator actuates the coupling mechanism under the control of the control valve to adjust the at least one unison ring.

The connecting fuel line may be connected to the control valve, wherein pressurizing the connecting fuel line causes the control valve to activate the actuator to move the variable stator vanes into the closed position, or the connecting fuel line may be connected directly to the actuator, wherein pressurizing the connecting fuel line causes movement of the actuator, such movement causing the variable stator vanes to move into the closed position.

In an embodiment, the actuator comprises a piston rod, wherein the detection system detects the position of the piston rod.

A further aspect of the present invention regards a method for limiting turbine overspeed in case of a shaft failure in a gas turbine engine which comprises an overspeed protection system which is able to detect a shaft failure of the gas turbine engine, the method comprising:
in case a shaft failure is detected, moving at least one row of variable stator vanes into a closed position which blocks air flow through a compressor,
detecting directly or indirectly the position of the at least one row of the variable stator vanes, and
upon detecting that the at least one row of variable stator vanes has moved into the closed position, setting bleed valves in the compressor of the gas turbine engine to an opened position in which the bleed valves divert airflow through the compressor to a bypass channel of the gas turbine engine.

The inventive method thus provides that the bleed valves are triggered by the variable stator vanes resuming a closed position to be set to the opened position, thereby further restraining energy from the core of the engine.

In an embodiment, the position of at least one row of the variable stator vanes or the position of an actuator of the at least one row of variable stator vanes is compared with a target position, wherein, if the two positions differ more than a predetermined threshold, the bleed valves are brought into the opened position. In a further embodiment, the rate of change of the position of at least one row of the variable stator vanes or rate of change of the position of the actuator of the at least one row of variable stator vanes is determined, wherein, if the rate of change is above a threshold rate of change, the bleed valves are brought in the opened position. The two embodiments may be combined.

The invention will be explained in more detail on the basis of exemplary embodiments with reference to the accompanying drawings in which.

Figure 1:
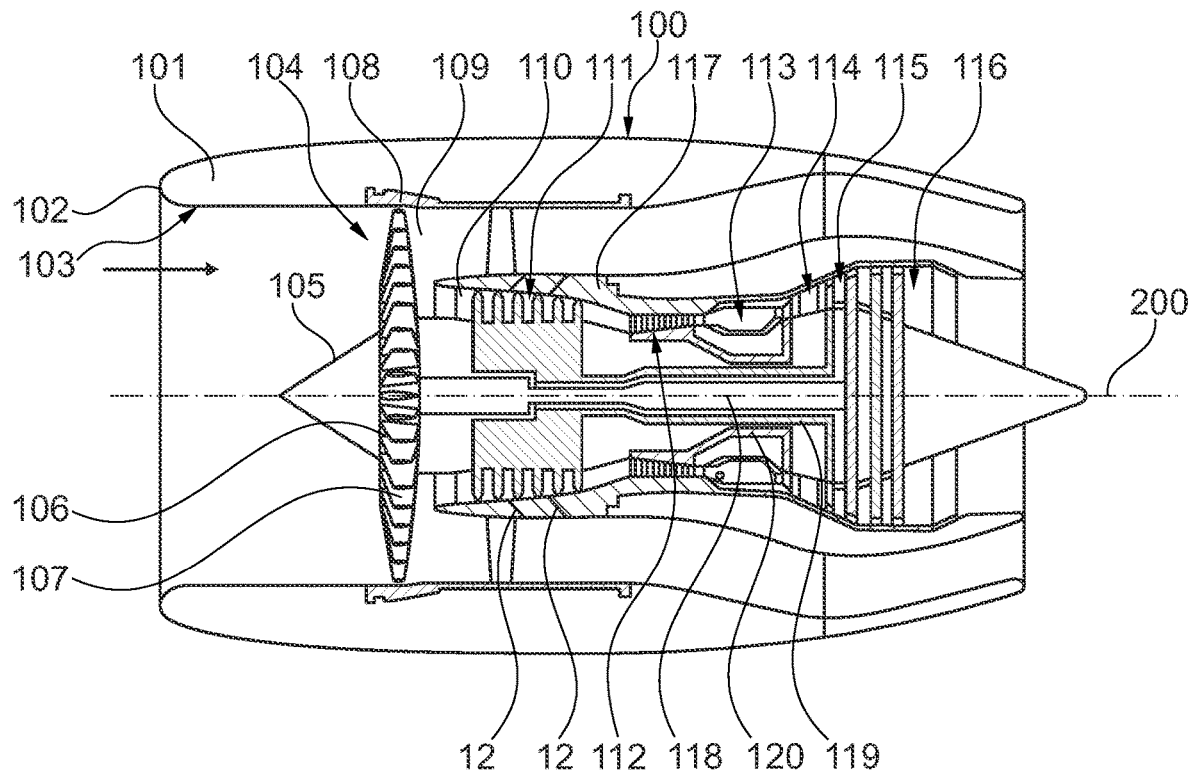
FIG. 1 is a simplified schematic sectional view of a gas turbine engine in which the present invention can be realized.

FIG. 1 shows, in a schematic manner, a turbofan gas turbine engine 100 that has a fan stage with a fan 104 as the low-pressure compressor, a medium-pressure compressor 111, a high-pressure compressor 112, a combustion chamber 113, a high-pressure turbine 114, a medium-pressure turbine 115, and a low-pressure turbine 116.

The medium-pressure compressor 111 and the high-pressure compressor 112 respectively have a plurality of compressor stages that respectively comprise a rotor stage and a stator stage. The turbofan engine 100 of FIG. 1 further has three separate shafts, a low-pressure shaft 118 that connects the low-pressure turbine 116 the fan 104, a medium-pressure shaft 119 that connects the medium-pressure turbine 115 to the medium-pressure compressor 111, and a high-pressure shaft 120 that connects the high-pressure turbine 114 to the high-pressure compressor 112. However, this is to be understood to be merely an example. If, for example, the turbofan engine has no medium-pressure compressor and no medium-pressure turbine, only a low-pressure shaft and a high-pressure shaft would be present.

The turbofan engine 100 has an engine nacelle 101 that comprises an inlet lip 102 and forms an engine inlet 103 at the inner side, supplying inflowing air to the fan 104. The fan 104 has a plurality of fan blades 107 that are connected to a fan disc 106. The annulus of the fan disc 106 forms the radially inner boundary of the flow path through the fan 104. Radially outside, the flow path is delimited by the fan housing 108. Upstream of the fan-disc 106, a nose cone 105 is arranged.

Behind the fan 104, the turbofan engine 100 forms a secondary flow channel 109 and a primary flow channel 110. The primary flow channel 110 leads through the core engine (gas turbine) that comprises the medium-pressure compressor 111, the high-pressure compressor 112, the combustion chamber 113, the high-pressure turbine 114, the medium-pressure turbine 115, and the low-pressure turbine 116. At that, the medium-pressure compressor 111 and the high-pressure compressor 112 are surrounded by a circumferential housing 117 which forms an annulus surface at the internal side, delimitating the primary flow channel 110 radially outside.

During operation of the turbofan engine 100, a primary flow flows through the primary flow channel 110, which is also referred to as the main flow channel, and a secondary flow flows through the secondary flow channel 109, which is also referred to as bypass channel, wherein the secondary flow bypasses the core engine.

The described components have a common rotational or machine axis 200. The rotational axis 200 defines an axial direction of the turbofan engine. A radial direction of the turbofan engine extends perpendicularly to the axial direction.

In the context of the present invention a control system is relevant that serves to protect the low-pressure turbine 116 in case the low-pressure shaft 118 breaks. However, the principles of the present invention similarly apply to protection of any other turbine in a gas turbine engine of the kind shown in FIG. 1 or of any other kind.

Figure 1A:
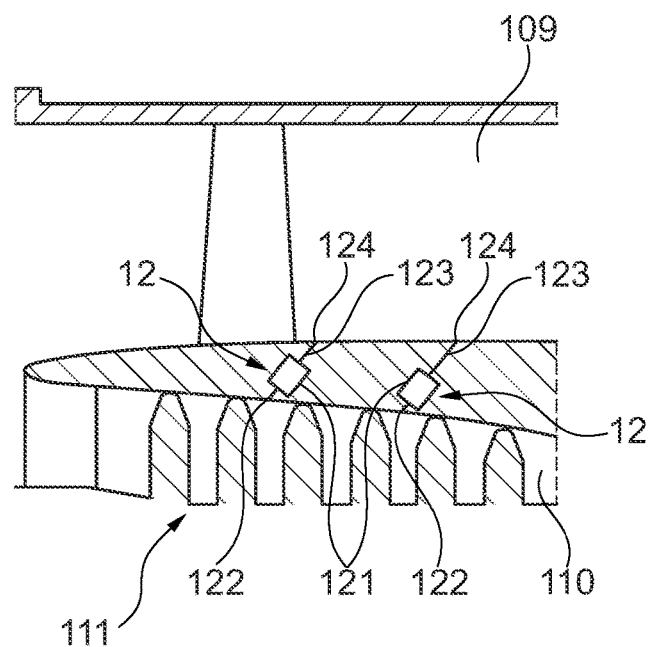
FIG. 1a is an enlarged section of FIG. 1 depicting bleed assemblies in a medium-pressure compressor of the gas engine turbine.
Figure 2:
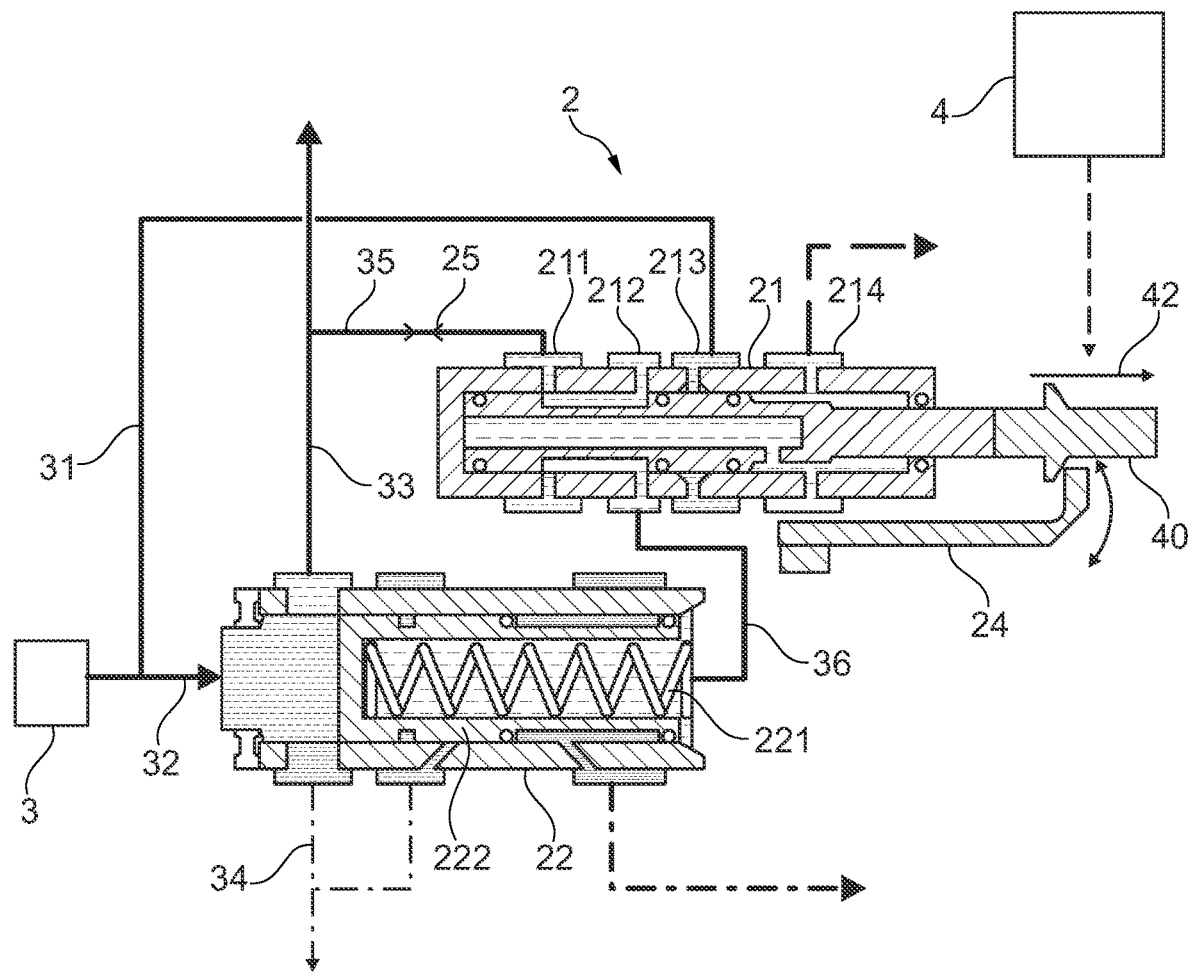
FIG. 2 shows schematically an embodiment of a fuel limiting mechanism that is coupled with an overspeed cable, wherein the fuel limiting mechanism limits the fuel supply to an engine combustor when the overspeed cable is pulled.
Figure 3:
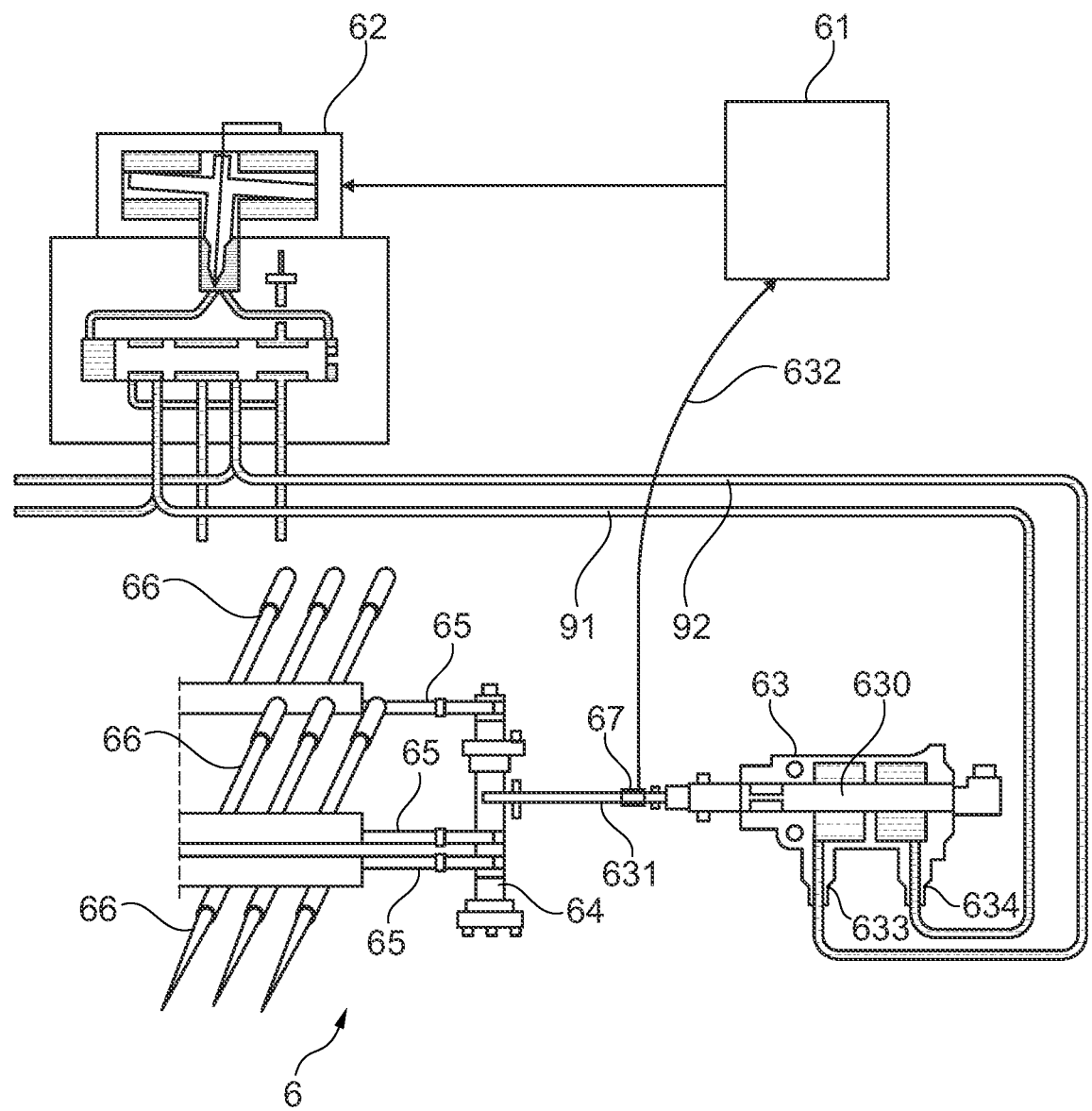
FIG. 3 shows schematically an embodiment of a variable stator vane mechanism that controls the rotational position of the vanes of at least one row of stator vanes of an engine compressor.
Figure 4:
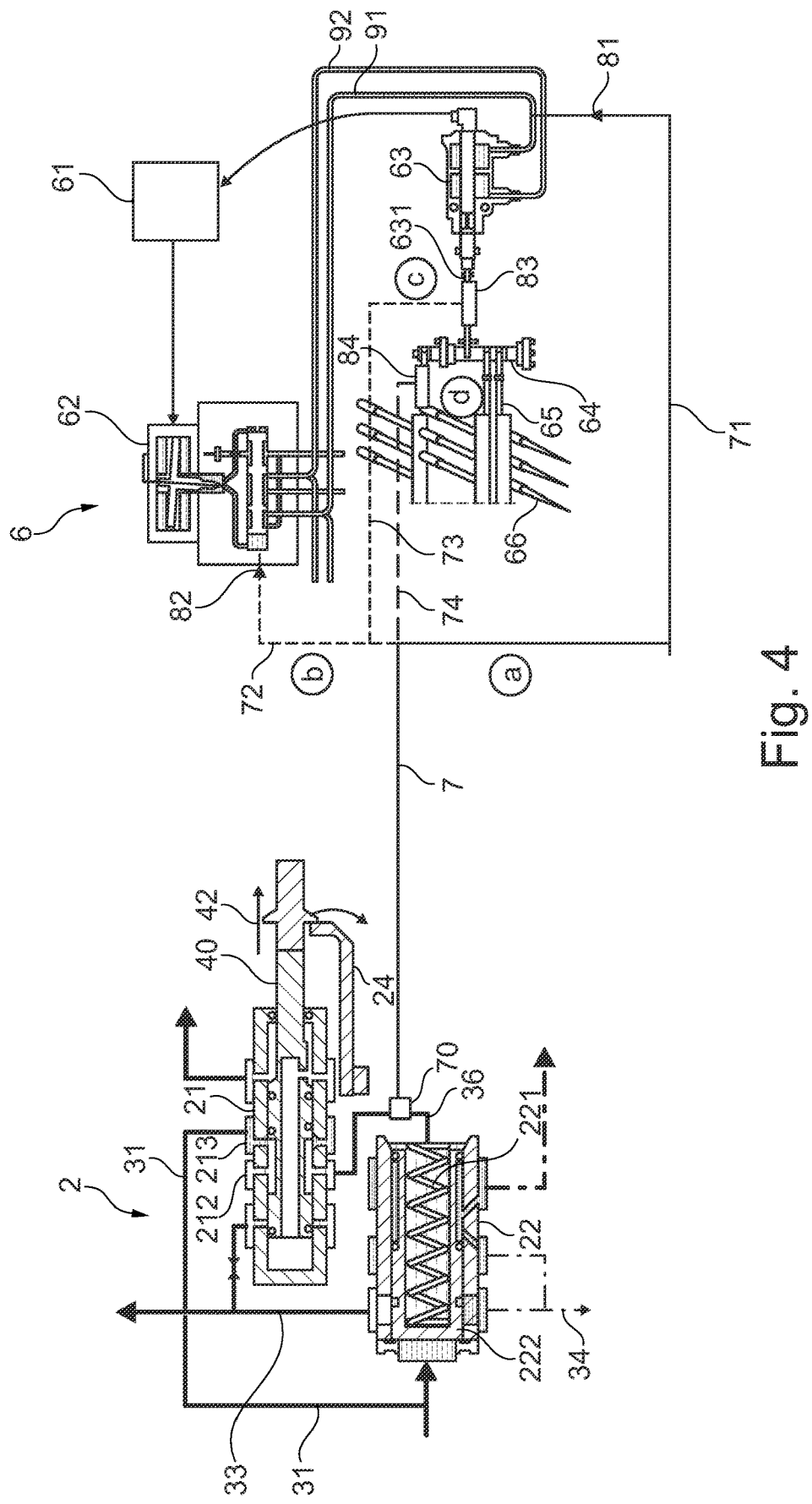
FIG. 4 shows an embodiment of a gas engine control system in which a fuel limiting mechanism according to FIG. 2 is connected to a variable stator vane mechanism according to FIG. 3 by means of a connecting fuel line, wherein, when the connecting fuel line is pressurized, it directly changes a pressure in at least one element of the variable stator vane mechanism.
Figure 5:
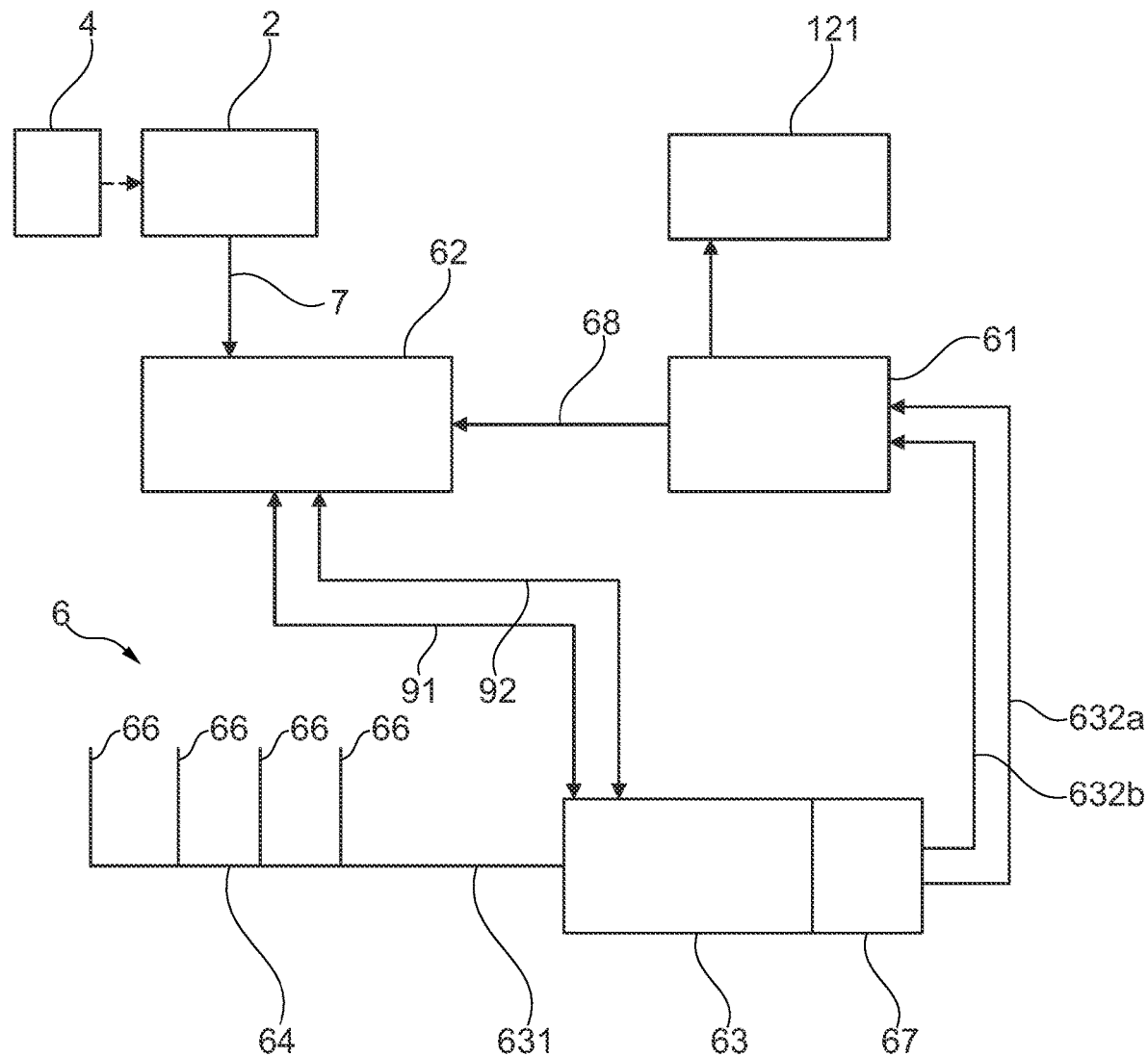
FIG. 5 shows a gas turbine engine control system including variable stator vanes and bleed valves, wherein the bleed valves are set to an opened position when the variable stator vanes are moved into a closed position.

The control system of the present invention comprises a fuel limiting mechanism that is depicted in itself in FIG. 2 and a variable stator vane mechanism that is depicted in itself in FIG. 3, wherein the combined system is depicted in FIG. 4. The control system of the present invention further comprises bleed valves schematically depicted in FIG. 1a and controlling the bleed valves to open if the variable stator vanes are moved into a closed position as depicted in FIG. 5.

Referring again to FIG. 1, the gas turbine engine further comprises a plurality of bleed assemblies 12 which are schematically depicted in FIG. 1 and shown in more detail, but also schematically, in FIG. 1a. In the depicted embodiment, the bleed assemblies 12 are implemented in the medium-pressure compressor 111, but could as well be implemented in the high-pressure compressor 112. The bleed assemblies serve, when in the opened position, to divert airflow through the compressor to the bypass channel 109. They thus allow to release pressure from an upstream part of the compressor which, e.g., allows to maintain a preferred pressure difference across the compressor. Such bleed assemblies are well known to the skilled person.

As shown schematically in FIG. 1a, there are provided several bleed assemblies 12 at different stages of the compressor 111, such as at stage 5 and at stage 7 or 8 of the compressor 111. At each such stage there may be two or more bleed assemblies 12. Each bleed assembly 12 comprises a duct 123 leading from the primary flow channel 110 to the bypass channel 109. The duct 123 comprises an inlet 122 at the primary flow channel outer boundary and an outlet 124 at the bypass channel inner boundary. A bleed valve 121 is located in the duct 123. The bleed assemblies 12 may comprise further components such as a diffuser at the transition to the bypass channel 109.

Each bleed valve 121 comprises an opened position and a closed position. The bleed valve 121 may comprise positions in between to allow to control the amount of gas flowing through the duct 123. In the closed position, there is no gas flow through the duct 123. The bleed valve 121 is controlled by the EEC ("Electronic Engine Control") of the gas turbine engine or another electronic control unit. When opened or partly opened, the core engine airflow is partly diverted through the bleed valve 121 to the bypass channel 109, where the diverted airflow mixes with the airflow in the bypass channel 109.

FIG. 2 depicts a fuel limiting mechanism 2 which is implemented by an overspeed and splitter unit. The fuel limiting mechanism 2 comprises an emergency shut-off valve 21 and a splitter valve 22 which cooperate in providing or limiting pressurized fuel coming from a fuel metering unit 3 into upper and lower fuel manifolds that feed the combustor nozzles of a combustor.

The emergency shut-off valve 21 cooperates with an activation member which is formed by an overspeed cable 40. The overspeed cable 40 is held in a first position depicted in FIG. 2 by a detent spring 24. By activation by a schematically depicted overspeed protection system 4, which is able to detect a shaft failure of the gas turbine engine, a pulling motion 42 can be applied to the overspeed cable, thereby moving the overspeed cable 40 in a second position as will be discussed with respect to FIG. 4.

The emergency shut-off valve 21 comprises a plurality of ports 211, 212, 213 and 214. In the first position of the overspeed cable 40 depicted in FIG. 2, the ports 211, 212 are in fluid communication.

The fuel metering unit 3 provides high-pressure fuel of a defined pressure. The high-pressure fuel is provided through pressure line 32 to one end of splitter valve 22 from where it is split into lines 33, 34 which lead into upper and lower fuel manifolds that feed the combustor nozzles. Further, line 31 with high pressure fuel is connected to port 213 of the emergency shut-off valve 21. From line 33, a line 35 leads through a damping orifice 25 to port 211 and, as ports 211 and 212 are connected, to fuel line 36 which applies pressure to the other side of splitter valve 22. This pressure feedback provided by lines 35, 36 leads to an equilibrium state in which the pressure applied to valve 22 is such that a spring 221 moves a piston 222 of the splitter valve 22 in a position in which high-pressure fluid can flow from line 32 into lines 33 and 34.

Before discussing the fuel limiting mechanism 2 after the overspeed cable 40 has been activated, the variable stator vane mechanism in itself is discussed with respect to FIG. 3. According to FIG. 3, the variable stator vane mechanism 6 comprises an electronic control unit 61 which may be the EEC ("Electronic Engine Control") of the gas turbine engine. The variable stator vane mechanism further comprises a control valve 62 and an actuator 63. The control valve 62 may be implemented as a servo valve. It provides as output a high-pressure fuel line 91 and a low-pressure fuel line 92. The amount of fuel supplied by the fuel lines 91, 92 is controlled by control unit 61. The fuel lines 91, 92 are input in ports 633, 634 of actuator 63. The pressure differential between these lines 91, 92 moves a piston 630 inside the actuator 63. The piston 630 is connected to a piston rod 631 which moves in a linear manner depending on the pressure differential between lines 91, 92.

The piston rod 631 is connected to a coupling mechanism which couples the actuator 63 with several unison rings 65, wherein each unison ring 65 is connected to a row of variable stator vanes 66. The connection between the unison ring 64 and each stator vane 66 is through a lever (not shown). The coupling mechanism comprises a crankshaft 64 which is connected to the piston rod 631. The crankshaft 64 is further connected to the unison rings 65. Accordingly, by linear movement of the piston rod 631 the unison rings 65 can be adjusted to rotate the variable stator vanes 66 in a desired position.

The position of the piston rod 631 is detected by a detection system 67 which may be implemented by means of a LVDT (Linear Variable Differential Transformer) position sensor. By measuring the position of piston rod 631, the detection system 67 indirectly measures the position of the variable stator vanes 66. For example, a particular position of the piston rod 631 indicates that the variable stator vanes 66 are in a closed position.

A feedback signal 632 is provided from the detection system 67 to the control unit 61. The use of such feedback signal 632 is further discussed with respect to FIG. 5.

It is pointed out that the coupling mechanism depicted in FIG. 3 regards an exemplary embodiment only. Other embodiments of the coupling mechanism are possible. For example, embodiments of the coupling mechanism are described in documents DE 10 2012 007 129 A1 and DE 10 2012 021 876 A1, the content of which is incorporated herein by reference.

It is further pointed out that the location of the detection system 67 adjacent piston rod 631 in FIG. 3 regards an exemplary embodiment. The detection system 67 may be located alternatively, e.g., to measure a linear displacement of the actuator piston 630, or may be located at one or several rows of the variable stator vanes 66 to determine their position directly. The detection system 67 may thus be located and configured to measure the position of the variable stator vanes 66 directly or alternatively indirectly through the position of the piston rod 631 and/or the position of the actuator piston 630 or other moving elements.

FIG. 4 shows an example of a gas turbine engine control system which illustrates some of the components of the gas turbine control system of the present invention. The control system comprises the fuel limiting mechanism of FIG. 2 and the variable stator vane mechanism of FIG. 3. FIG. 4 shows the fuel limiting mechanism of FIG. 2 in the state in which the overspeed cable 40 has been activated in that a pulling motion 42 has been applied to the overspeed cable 40. Upon activation, the detent spring 24 is flexed and the overspeed cable 40 is moved into the second position. In the second position, ports 212 and 213 of the emergency shut-off valve 21 are connected. Therefore, high-pressure fuel provided through fuel line 31 is now applied to port 212 and from port 212 through fuel line 36 to the one end of splitter valve 22. With the pressure being increased, spring 221 is extended and moves piston 222 in a position in which it blocks fuel lines 33, 34. Accordingly, the provision of fuel to the upper and lower manifolds that feed the combustor nozzles is shut-off.

The fuel limiting mechanism 2 and the variable stator vane mechanism 6 are connected by a connecting fuel line 7. The connecting fuel line 7 diverts in a T-shaped diversion 70 from fuel line 36 that connects the emergency shut-off valve 21 and the splitter valve 22. Accordingly, when the overspeed cable 40 is activated such that the pressure in fuel line 36 is increased, there is also an increase in the pressure of connecting fuel line 7. In other words, the connecting fuel line 7 is pressurized when the overspeed cable 40 is activated.

The other end of connecting fuel line 7 is connected to an element of the variable stator vane mechanism 6, wherein pressurizing the connecting fuel line 7 activates such element to the effect that at least one row of variable stator vanes 66 is moved into the closed position in which the gas path of the engine is blocked.

There exists a plurality of embodiments as to what element of the variable stator vane mechanism 6 the other end of the connecting fuel line 7 is connected to. FIG. 4 depicts four different embodiments in scenarios a, b, c and d, wherein these scenarios can be combined in all combinations. A common link of these four embodiments is that the respective elements of the variable stator vane mechanism are directly exposed to the flow and pressure in connecting fuel line 7, such that a pressure change is directly achieved by means of the connecting fuel line 7 when pressurized.

According to scenario a, the end 71 of connecting fuel line 7 is connected through a one-way valve 81 to high-pressure fuel line 91. Thereby, the pressure inside the actuator 63 is increased such that the piston rod 631 is moved in a linear manner. Such movement leads to a rotation of the crankshaft 64, which rotation moves the unison rings 65 in a position in which the variable stator vanes 66 are in the closed position which blocks airflow through the compressor.

According to scenario b, the end 72 of connecting fuel line 7 is connected through a one-way valve 82 to the servo valve 62. By similar fueldraulic means that are used in the servo valve 62, this causes the servo valve 62 to command actuator 63 to fully close variable stator vanes 66.

According to scenario c, the end 73 of connecting fuel line 7 is connected to a ram actuator 83 that is additionally provided and situated between actuator 63 and crankshaft 64. Upon pressurizing of the connecting fuel line 7, the ram actuator 83 increases the rod length of piston rod 631 sufficiently and (with enough margin) to bring the variable stator vanes 66 the closed position beyond the operable margins. This closed position will block the gas path of the engine, thereby restraining energy from the core of the engine.

According to scenario d, the end 74 of connecting fuel line 7 is connected to a ram actuator 84 that is additionally provided and situated between the crankshaft 64 and one of the unison rings 65. Pressurizing the connecting fuel line 7 causes the ram actuator 84 to increase the rod length (with enough margin) such that the respective unison ring is moved into a position such that the variable stator vanes 66 connected to the unison ring are moved into the closed position. Such closing of one row of variable stator vanes 66 is independent of the position of the actuator piston rod 631. Although one row of variable stator vanes 66 is closed only, one fully closed row can be sufficient to completely block the gas path of the engine.

As mentioned before, the previous solutions a, b, c and d can be combined with each other in any possible combination of one or several of these solutions. Each of these solutions will function in combination with one or more of the other solutions provided the connecting fuel line 7 is sized adequately. By combining solutions, each solution will contribute to the rate at which the variable stator vanes 66 are set to the closed position.

In alternative embodiments (not shown), the connecting fuel line 7 does not directly change pressure in an element of the variable stator vane mechanism, but is connected to and controls a control element, wherein the control element controls pressure in an element of the variable stator vane mechanism. Accordingly, in such alternative embodiment, pressurizing of the connecting fuel line is used to switch a control element to provide additional pressure to an element of the variable stator vane mechanism.

FIG. 5 depicts schematically a gas turbine engine control system in accordance with the present invention. The gas turbine engine control system comprises an overspeed protection system 4 as discussed with respect to FIG. 2, wherein the overspeed protection system 4 is configured to detect a shaft failure of the gas turbine engine. If a shaft failure of the gas turbine engine is detected, as discussed with respect to FIG. 4, the overspeed protection system 4 is activated to trigger the fuel limiting mechanism 2 to limit the fuel supply to the gas turbine engine combustor and to pressurize the connecting fuel line 7 connecting the fuel limiting mechanism 2 with a control valve 62 of the variable stator vane mechanism 6 (or another element of the variable stator vane mechanism 6), thereby activating the variable stator vane mechanism 6 to move the variable stator vanes 66 (or at least one row of the variable stator vanes) into the closed position in which airflow through the compressor is blocked.

The variable stator vane mechanism 6 comprises the control valve 62, an actuator 63 and further elements as discussed with respect to FIG. 3 such as a piston rod 631 and a coupling mechanism 64 (depicted schematically only) to actuate the variable stator vanes 66 which are arranged in several rows.

The gas turbine engine control system further comprises a detection system 67 associated with the actuator 63 (or alternatively associated directly with the variable stator vanes 66) such as the detection system 67 of FIG. 3, wherein the detection system 67 is configured to detect/measure directly or indirectly the position of the variable stator vanes 66 (or of at least one row of the variable stator vanes). The measurement signals are provided through line 632b to an electronic control unit 61 such as the gas turbine engine EEC (as discussed with respect to FIG. 3). The detection system 67 may also receive control signals from the electronic control unit 61 through line 632a.

The gas turbine engine control system further comprises the bleed valves 121 of the compressor in which the variable stator vanes 66 are located, such as bleed valves 121 of intermediate-pressure compressor 111 shown in FIG. 1a. Opening and closing of the bleed valves 121 is controlled by the electronic control unit 61.

The electronic control unit 61 determines, based on the signals 632b received from the detection system 67, if the variable stator vanes 66 are moved into the closed position by means of pressurizing fuel line 7. This can be exactly determined as such closing of the variable stator vanes corresponds to a signal of the detection system 67 that is vastly different from the signal provided by detection system 67 during normal operation, in which the control unit 61 uses the feedback of the signal provided by detection system 67 to position the variable stator vanes 66 in a target position (e.g., by providing a respective control signal 68 to control valve 62). Accordingly, the control unit 61 is configured to compare the position of the variable stator vanes 66 as indicated by the signal provided by the detection system 67 with a target position of the variable stator vanes 66. If the two positions differ more than a predetermined threshold, the electronic control unit 61 sets the bleed valves 121 to the opened position, thereby reducing the pressure in the compressor and restraining energy from the engine core.

The electronic control unit 61 is further able to determine if the variable stator vanes 66 have been moved into the closed position by determining the rate of change of the position of the variable stator vanes as indicated by the signal provided by the detection system 67. As, in case of a shaft failure, the variable stator vanes 66 are moved rapidly into the closed position, the event that the variable stator vanes have been moved into the closed position can be determined also by determining the rate of change of the position of the variable stator vanes. If the rate of change is above a threshold rate of change, the electronic control unit 61 sets the bleed valves 121 to the open position.

It may be provided that the electronic control unit 61 determines both the amount of the change in position of the variable stator vanes 66 and the rate of change of the position of the variable stator vanes 66 before setting the bleed valves 121 to the open position.

Figure 6:
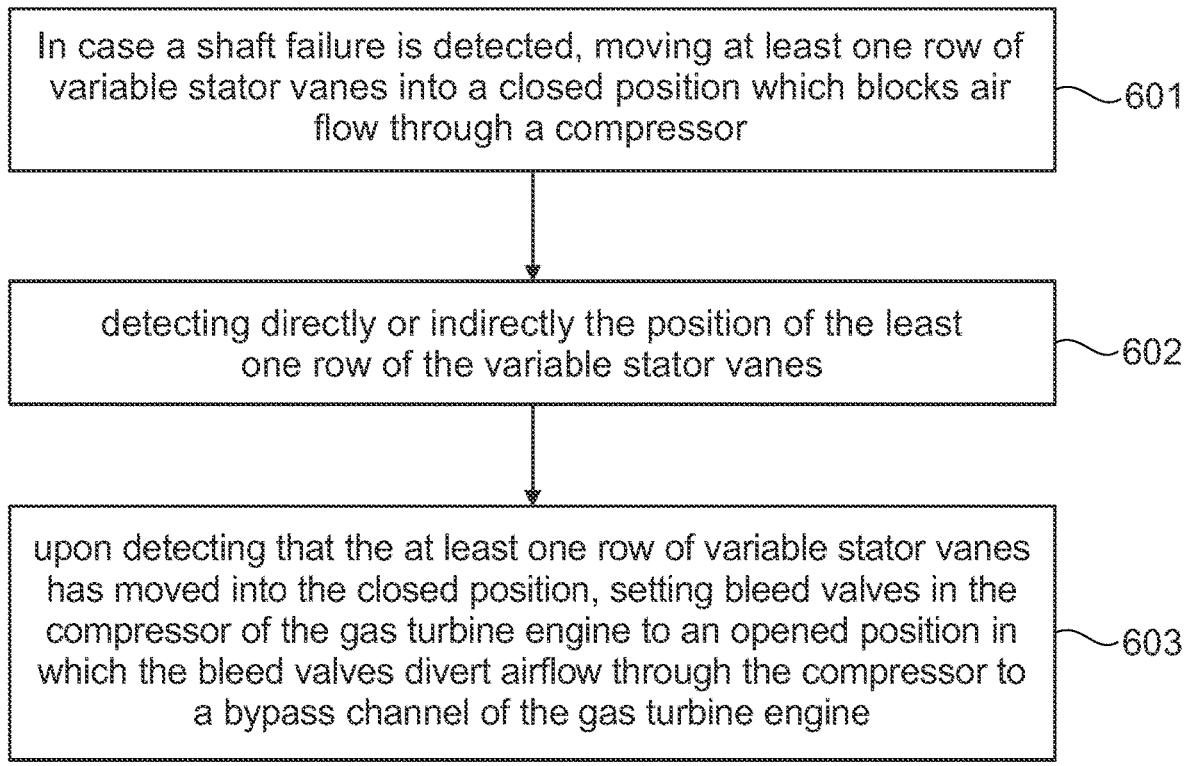
FIG. 6 is a flowchart of a method for limiting turbine overspeed in case of a shaft failure.

FIG. 6 depicts steps of a method for limiting turbine overspeed in case of a shaft failure in a gas turbine engine.

According to step 601, in case a shaft failure is detected, at least one row of variable stator vanes is moved into a closed position which blocks air flow through a compressor, this may be implemented by coupling the variable stator vane mechanism to the fuel limiting mechanism as discussed with respect to FIGS. 2 to 4. In step 602, it is detected directly (by direct measurement of the position of the variable stator vanes) or indirectly (by measuring the position of an actuating element of the variable stator vanes) the position of the at least one row of the variable stator vanes. Upon detecting that the at least one row of variable stator vanes 66 has moved into the closed position, the bleed valves in the compressor are set to the opened position in which the bleed valves divert airflow through the compressor to a bypass channel of the gas turbine engine in step 603. In case the bleed valves may be partly opened, the bleed valves are preferably set to the fully opened position.

It should be understood that the above description is intended for illustrative purposes only, and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. Any ranges given herein include any and all specific values within the range and any and all subranges within the given range.

The invention claimed is:

1. A gas turbine engine control system for limiting turbine overspeed in case of a shaft failure, the control system comprising:
    an overspeed protection system which is configured to detect a shaft failure of the gas turbine engine,
    a variable stator vane mechanism, wherein the variable stator vane mechanism is configured to adjust a vane position of variable stator vanes of a compressor of the gas turbine engine, wherein the variable stator vane mechanism is activated to rotationally move at least one row of the variable stator vanes into a closed position which blocks air flow through the compressor in case the shaft failure is detected,
    bleed valves in the compressor of the gas turbine engine having a closed position and an opened position, wherein the bleed valves are configured to divert in the opened position airflow through the compressor to a bypass channel of the gas turbine engine,
    a detection system detecting directly or indirectly the vane position of at least one row of the variable stator vanes,
    wherein the control system is configured to set the bleed valves to the opened position when the detection system detects that the at least one row of variable stator vanes has moved into the closed position;
    wherein the control system further comprises an electronic control unit, wherein the bleed valves are set to the opened position under the control of the electronic control unit; and
    wherein the detection system comprises a position sensor that feeds the vane position of the at least one row of the variable stator vanes or an actuator position of an actuator of the at least one row of variable stator vanes to the electronic control unit.

2. The control system of claim 1, wherein the electronic control unit is configured to compare the vane position or the actuator position with a target position, wherein, if at least one of vane position or the actuator position differs more than a predetermined threshold, the electronic control unit is further configured to set the bleed valves to the opened position.

3. The control system of claim 1, wherein the electronic control unit is configured to determine a rate of change of the vane position or a rate of change of the actuator position, wherein, if the rate of change of either the vane position or the actuator position is above a threshold rate of change, the electronic control unit is further configured to set the bleed valves to the opened position.

4. The control system of claim 2, wherein the electronic control unit is configured to determine a rate of change of the vane position or a rate of change of the actuator position, wherein, if the rate of change of either the vane position or the actuator position is above a threshold rate of change, the electronic control unit is further configured to set the bleed valves to the opened position.

5. The control system of claim 4, wherein the electronic control unit is configured to set the bleed valves to the opened position if both the vane position and the actuator position differ more than the predetermined threshold and if the rate of change of both the vane position or the actuator position is above the threshold rate of change.

6. The control system of claim 1, wherein the control system further comprises
    a fuel limiting mechanism coupled to the overspeed protection system, wherein the fuel limiting mechanism is configured to limit the fuel supply to a combustor of the gas turbine engine combustor if the overspeed protection system detects the shaft failure;
    wherein the variable stator vane mechanism is coupled to the fuel limiting mechanism, and wherein the variable stator vane mechanism is activated to move the at least one row of the variable stator vanes into the closed position if the fuel limiting mechanism limits the fuel supply to the combustor.

7. The control system of claim 6, wherein
    the overspeed protection system activates an activation member in case the shaft failure is detected;
    the fuel limiting mechanism is coupled with the activation member and configured to limit the fuel supply to the combustor if the activation member is activated;
    a connecting fuel line is provided that connects the fuel limiting mechanism and the variable stator vane mechanism,
    wherein upon activation of the activation member the fuel limiting mechanism pressurizes the connecting fuel line, thereby activating the variable stator vane mechanism to move at least one row of the variable stator vanes into the closed position.

8. The control system of claim 7, wherein the fuel limiting mechanism comprises an emergency shut-off valve and a splitter valve, wherein upon activation of the activation member the emergency shut-off valve activates the splitter valve to limit the fuel to the combustor, wherein the splitter valve is activated by diverting to the splitter valve through the emergency shut-off valve pressurized fuel that under normal operating conditions is used to feed the combustor.

9. The control system of claim 7, wherein the fuel limiting mechanism is implemented in an overspeed and splitter unit which
- splits the pressurized fuel coming from a fuel metering unit into upper and lower fuel manifolds that feed the nozzles of the combustor under normal operating conditions;
- limits the fuel from the fuel metering unit into the upper and lower fuel manifolds if the activation member is activated; and
- pressurizes the connecting fuel line if the activation member is activated.

10. The control system of claim 9, wherein the connecting fuel line is connected to a valve, an actuator and/or a control element of the variable stator vane mechanism, wherein pressurizing the connecting fuel line activates the valve, actuator or control element to effect movement of at least one row of the variable stator vanes into the closed position.

11. The control system of claim 1, wherein the variable stator vane mechanism comprises a control valve, an actuator, a coupling mechanism and at least one unison ring connected to the stator vanes, wherein
- the control valve controls actuation of the actuator via high pressure and low pressure fuel lines,
- the coupling mechanism couples the actuator and the at least one unison ring, and,
- the actuator actuates the coupling mechanism under control of the control valve to adjust the at least one unison ring,
- and wherein the actuator comprises a piston rod, wherein the detection system detects a position of the piston rod.

12. A method for limiting turbine overspeed in case of a shaft failure in a gas turbine engine which comprises an overspeed protection system which is configured to detect the shaft failure of the gas turbine engine, the method comprising:
- in case the shaft failure is detected, moving at least one row of variable stator vanes into a closed position which blocks air flow through a compressor,
- detecting directly or indirectly a vane position of the at least one row of the variable stator vanes,
- upon detecting that the at least one row of variable stator vanes has moved into the closed position, setting bleed valves in the compressor of the gas turbine engine to an opened position in which the bleed valves divert airflow through the compressor to a bypass channel of the gas turbine engine; and
- comparing the vane position of the at least one row of the variable stator vanes, or an actuator position of an actuator of the at least one row of variable stator vanes, with a target position, wherein, if at least one of the vane position or the actuator position differs more than a predetermined threshold, setting the bleed valves to the opened position.

13. The method of claim 12, and further comprising determining a rate of change of the vane position or a rate of change of the actuator position, wherein, if the rate of change of either the vane position or the actuator position is above a threshold rate of change, setting the bleed valves are set to the opened position.

14. A method for limiting turbine overspeed in case of a shaft failure in a gas turbine engine which comprises an overspeed protection system which is configured to detect the shaft failure of the gas turbine engine, the method comprising:
- in case the shaft failure is detected, moving at least one row of variable stator vanes into a closed position which blocks air flow through a compressor,
- detecting directly or indirectly a vane position of the at least one row of the variable stator vanes,
- upon detecting that the at least one row of variable stator vanes has moved into the closed position, setting bleed valves in the compressor of the gas turbine engine to an opened position in which the bleed valves divert airflow through the compressor to a bypass channel of the gas turbine engine;
- determining a rate of change of the vane position of the at least one row of the variable stator vanes or a rate of change of an actuator position of an actuator of the at least one row of variable stator vanes, wherein, if the rate of change of either the vane position or the actuator position is above a threshold rate of change, setting the bleed valves to the opened position.

* * * * *